United States Patent
Peake, III et al.

(10) Patent No.: US 12,494,996 B1
(45) Date of Patent: Dec. 9, 2025

(54) NETWORK DEVICE ADDRESS MAPPING

(71) Applicant: Amazon Technologies, Inc., Seattle, WA (US)

(72) Inventors: Burton Tracy Peake, III, Nashville, TN (US); Chris S McGuire, Liberty Hill, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/742,696

(22) Filed: May 12, 2022

(51) Int. Cl.
*H04L 45/42* (2022.01)
*H04L 45/00* (2022.01)
*H04L 47/122* (2022.01)

(52) U.S. Cl.
CPC .............. *H04L 45/42* (2013.01); *H04L 45/38* (2013.01); *H04L 47/122* (2013.01)

(58) Field of Classification Search
CPC ........ H04L 45/42; H04L 45/38; H04L 47/122
USPC ........................................................ 709/238
See application file for complete search history.

(56) References Cited

U.S. PATENT DOCUMENTS

| | | | | |
|---|---|---|---|---|
| 9,300,581 B1 * | 3/2016 | Hui | ..................... | H04L 45/741 |
| 10,904,201 B1 * | 1/2021 | Ermagan | ............. | H04L 61/5076 |
| 2014/0269702 A1 * | 9/2014 | Moreno | ............... | H04L 61/5038 |
| | | | | 370/390 |
| 2017/0078241 A1 * | 3/2017 | Zhang | ..................... | H04L 45/02 |
| 2017/0289033 A1 | 10/2017 | Singh et al. | | |
| 2019/0081890 A1 * | 3/2019 | Ravindran | ............ | H04L 45/741 |
| 2021/0377208 A1 * | 12/2021 | Xiaopu | ................... | H04L 45/02 |
| 2022/0021586 A1 * | 1/2022 | Kazmierski | ......... | H04L 67/1004 |
| 2023/0179439 A1 * | 6/2023 | Thubert | .................. | H04L 45/54 |
| | | | | 709/224 |

FOREIGN PATENT DOCUMENTS

WO    WO-2013044691 A1 *    4/2013    ............. H04L 45/00

* cited by examiner

*Primary Examiner* — Ario Etienne
*Assistant Examiner* — Kidest Mendaye
(74) *Attorney, Agent, or Firm* — Kilpatrick Townsend & Stockton LLP

(57) ABSTRACT

Techniques for determining mapping information for endpoints in a computer network are described. In an example, a system receives, from a first network device, a first request for mapping information associated with an endpoint such that the first network device can send traffic to the endpoint. The system sends, to a second network device based at least in part on the first request, a second request indicating the endpoint. The second request causes the second network device to discover the endpoint. The system receives, from the second network device, an indication of a discovery of the endpoint by the second network device. The system also sends, to the second network device, a response to the first request. The response indicates the mapping information. The mapping information indicates that the traffic can be sent to the endpoint via the second network device.

20 Claims, 9 Drawing Sheets

US 12,494,996 B1

NETWORK DEVICE ADDRESS MAPPING

BACKGROUND

Computer networks generally include multiple devices that can exchange traffic therebetween. Multiple communication protocols exist to enable a device to join a computer network and exchange traffic with one or more other devices of the computer network. Further, multiple communication protocols exist to enable a device that is not part of the network to exchange traffic with one or more devices of the computer network.

BRIEF DESCRIPTION OF THE DRAWINGS

Various embodiments in accordance with the present disclosure will be described with reference to the drawings, in which.

DETAILED DESCRIPTION

Figure 1:
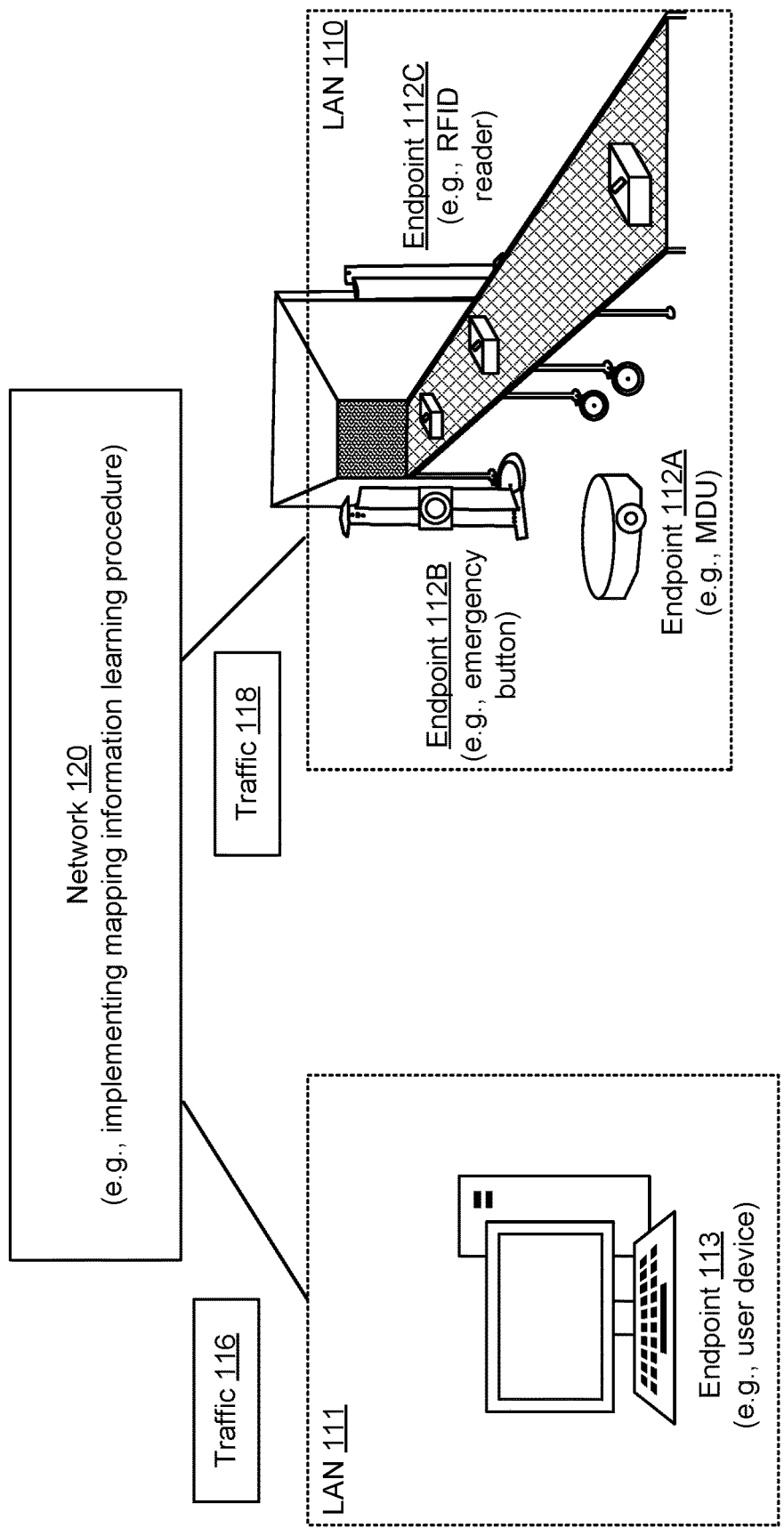
FIG. 1 illustrates an example of a computer network implemented in association with a facility, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, determining mapping information for endpoints in a computer network, where the mapping information is usable to exchange traffic with the endpoints. In an example, mapping information of an endpoint associates an identifier of an endpoint with a location within a computer network. The identifier may correspond to a network address (e.g., an internet protocol (IP) address) of the endpoint. The location may correspond to a network device of the computer network, where the network device is configured to manage (e.g., route) traffic to and from the endpoint. As such, to send traffic (e.g., packets) to the endpoint, the identifier of the endpoint is mapped to the location based on the mapping information and the traffic is sent to that location (e.g., to the network device that then sends it to the endpoint). However, in certain situations, the mapping information may not be available yet. These situations include, for instance, the endpoint having recently joined the computer network and not having been discovered yet. These situations also include, for instance, the endpoint having changed locations and its new location having not been discovered yet (e.g., due to its physical mobility, the endpoint may disconnect from the existing network device and subsequently communicatively re-attach to a different network device). In addition, some of the situations can relate to the network device. For instance, the network device (e.g., an egress router) may have rebooted and lost its local database, such that mapping information for the endpoint may no longer be accessible. Or the network device may remove the mapping information from its local database when there is not enough traffic to the endpoint. In such and other situations, the endpoint may be referred to as a silent endpoint (e.g., an endpoint that has not been discovered yet, or to be more specific, with an undiscovered location). Rather than dropping or not sending traffic to a silent endpoint, embodiments of the present disclosure enable a mapping information learning procedure.

This procedure may involve a mapping system that maintains mapping information of the endpoints. Upon a request for the mapping information of an endpoint, the mapping system determines whether such information is already stored. If so, a response indicating the mapping information is sent back. Otherwise, the mapping system queries network devices that have existing, established connections with the mapping system and that manage traffic to the endpoints by sending them (e.g., broadcasting, multicasting, or unicasting) a request for information about the endpoint. If a response is received from any of the network devices indicating that the endpoint can be reached via this network device, the mapping system stores mapping information for the endpoint, where this mapping information associates the endpoint with the network device (e.g., the endpoint's identifier with the network device's location). Otherwise, the mapping system determines that the endpoint is not reachable. If reachable, the mapping system sends a response to the mapping information request indicating the mapping information. If unreachable, the mapping system sends a response indicating that the mapping information is unavailable.

To illustrate, consider an example of a fulfillment center that includes a number of endpoints, such as mobile drive units (MDUs), emergency buttons, etc. These endpoints join a local area network (LAN), which can be implemented as a virtual LAN (VLAN). An overlay network can be used to connect the LAN to other computing components, such as to another LAN or a to a user device that does not belong to the LAN. The overlay network can implement one or more mapping system technologies, such as a location identifier separation protocol (LISP). Some of the endpoints can be silent endpoints. For instance, an emergency button may be installed but may not have broadcasted messages yet and, thus, has not been discovered by the overlay network. In another instance, an MDU may have moved from one area to another area of the fulfillment center and, because of the movement, the network path to reach the MDU has changed and has not been discovered yet by the overlay network. A device can send traffic to a silent endpoint (e.g., the emergency button or the MDU), where the device is not on the LAN, and where the traffic includes an IP address of the silent endpoint as the destination address. An ingress traffic router of the overlay network can receive the traffic and determine, based on its local map table, that a routing locator (RLOC) is not available for the endpoint identifier (EID), where the EID includes the IP address. The ingress traffic router then sends a request to a mapping server of the overlay network, where the request includes the EID. In turn, the mapping server can determine, based on its local map table, that the ROLC is not available for the EID. Here, whereas a conventional implementation of the LISP protocol would return a response indicating that no mapping information exists for the silent endpoint, the mapping server instead performs a query to egress traffic routers of the overlay network. The query causes one or more of such egress traffic routers to initiate a discovery procedure, such as by broadcasting an address resolution protocol (ARP) request. The silent endpoint sends back a response (e.g., an ARP) response to the relevant egress traffic router that then discovers the silent endpoint (at which point, this silent endpoint is no longer considered "silent" and can be referred to herein as an "endpoint" because it has been discovered). The egress traffic router sends registration information to the mapping server indicating the endpoint. The mapping server stores mapping information as an entry in its map table, where this mapping information includes the RLOC corresponding to the egress traffic router. The mapping server also sends the mapping information to the ingress traffic router. Now that the ingress traffic router has the mapping information, it can determine the RLOC, encapsulate the traffic (e.g., the packet), and send them via the overlay traffic to the egress traffic router that, in turn, decapsulates the traffic and sends it to the endpoint.

Embodiments of the present disclosure provide several technical advantages (e.g., improvements over conventional LISP implementations). For instance, the mapping information learning procedure enables the discovery of endpoints, including of silent endpoints, without necessitating specialized hardware on network devices (e.g., egress traffic routers). The discover also may not necessitate additional logic or specialized hardware on endpoints. For instance, an endpoint need not be modified such that that it announces itself upon joining a network for its mapping information to be learned by the network. Instead, the network (e.g., a mapping server) may learn the mapping information through a targeted discovery procedure without the need to a prior endpoint announcement. The discovery procedure supports scalability, where the number of network devices and endpoints can be easily increased. Because an endpoint is discovered even in large networks, rather than traffic to it being dropped, the proper mapping information is determined by executing the mapping information learning procedure, and traffic is sent to this endpoint. Further, no network flooding is used when the mapping information is unavailable, thereby improving network bandwidth usage. As such, higher data throughput can be achieved (e.g., because no traffic is dropped and improved network bandwidth usage) and/or the network latency to start a traffic exchange with the endpoint can be decreased. In addition, custom discovery mechanisms do not need to be built on a per-network and per-use case basis. These and other technical advantages are further described in connection with the next figures.

FIG. 1 illustrates an example of a computer network implemented in association with a facility, according to embodiments of the present disclosure. As illustrated, the facility includes a storage space for processing items, such as a fulfillment center from which the items can be shipped. Within the facility, a first local area network (LAN) 110 can be configured and can include a number of endpoints 112A, 112B, and 112C (all of which are generally referred to as an endpoint 112). Remote from the facility (e.g., at a remote location, such as another facility) or local at the same facility, a second LAN 111 can be configured and can include an endpoint 113 (or a number of such endpoints). A network 120 can be used to connect the two LANs 110 and 111, such that the endpoint 113 can exchange traffic with any of the endpoints 112. The LANs 110 and 111 and the network 120 can form the computer network. The network 120 can include underlay resources and overlay resources as further described in the next figures.

In an example, each of the LANs 110 and 111 and/or portions thereof (e.g., switches, routers, etc.) can be implemented as a virtual LAN (VLAN) using computing components of an underlay network (also referred to as a physical network, a substrate network, or a fabric network). The computing components can be virtualization devices. The illustrated endpoints 112 and 113 are hardware components, although it is possible that additional endpoints of the LAN 110 and/or LAN 111 can be virtualized endpoint. In the example of a VLAN implementation, the two VLANs can, but need not, share a subnet.

In the illustration of FIG. 1, the endpoint 112A is an MDU configured to, for example, move a container loaded with items to a workstation by a conveyor belt. In comparison, the endpoint 112B is an emergency button that can be pushed to stop operations of the conveyor belt and/or other endpoints 112 (e.g., the endpoint 112A). The endpoint 112C is a radio frequency identification (RFID) reader that reads RFID tags attached to items that are placed on the conveyor belt. The endpoint 113 can be a user device that can exchange traffic 116 and 118 with one or more of the endpoints 112. The traffic 116 can be sent from the endpoint 113, whereas the traffic 118 can be sent from an endpoint 112. For instance, the user device can request and receive state data of the emergency button (e.g., enabled, disabled), can send a command to the MDU to perform a particular operation or move to a particular area, and can request the RFID reader to send particular RFID measurements. Of course, other types of endpoints can be used including, for instance, internet of things (IoT) devices, wearable devices, smart devices, mobile devices, wearable devices, and the like.

The flow of the traffic 116 and 118 can be managed, at least in part, by the network 120. In particular, the network 120 can be configured as a tunnel or bridge between the two LANs 110 and 111 (or VLANs) and can include network devices, such as routers, switches, etc. that perform Layer 2 and/or Layer 3 operations. Such network devices can be referred to herein as overlay network devices and examples thereof are further described in the next figures. The operations can include encapsulating, decapsulating, and routing (e.g., tunneling) the traffic 116 sent from the endpoint 113 such that this traffic 116 reaches the relevant endpoint(s) 112. Such operations can also include encapsulating, decapsulating, and routing (e.g., tunneling) the traffic 118 sent from the relevant endpoint(s) such that this traffic 118 reaches the endpoint 113. Some or all of the overlay network devices can be virtualized components executing on virtualization devices. The network 120 implements one or more communication protocols that manages the traffic 116 and 118 based on identifiers of endpoints 112 and 113 (e.g., their IP addresses) and locations of overlay network devices (e.g., their IP addresses) to which the endpoints 112 and 113 are attached, such as LISP, ethernet virtual private network (EVPN), or other protocols.

In an example, the network 120 implements a mapping information learning procedure, as described herein above, in support of a communication protocol used to manage the traffic 116 and 118 (e.g., LISP and/or EVPN). For instance, the communication protocol uses mapping information that maps an identifier of an endpoint to a location of an overlay network device. When such mapping information is not available for the endpoint, the mapping information learning procedure is executed to query one or more of the overlay network devices about the endpoint. Upon a query response from an overlay network device, the mapping information is stored and maps the identifier to the location of the overall network device. This mapping information can then be used for the traffic sent to and/or from the endpoint.

In the illustration of FIG. 1, different reasons can exist for the endpoint to be silent. The mapping information learning procedure can be used without a need to implement particular logic or program code on the endpoint and/or an overlay network device. A reason for the endpoint to be silent is explained by referring to the endpoint 112A. In particular, the mobility of this endpoint 112A (e.g., the capability of the MDU to move between areas) can result in the network path to the endpoint 112A changing over time. Upon a change to the network path, the endpoint 112A can remain silent until it sends traffic (e.g., broadcasts a message) and thus, in absence of the mapping information learning procedure, would not have been discovered during the silence time period. Another reason for the endpoint to be silent is explained by referring to the endpoint 112B. In particular, this endpoint 112B may be recently deployed (e.g., installed) and, as such, may not have sent any traffic yet (e.g., broadcasts a message), and can remain silent until a condition is detected and triggers the traffic transmission (e.g., the emergency button being pushed in an emergency situation). Thus, absent the mapping information learning procedure, the endpoint 112B would not have been discovered until the triggering condition was detected.

Different variations to the computer environment of FIG. 1 exists and the embodiments of the present disclosure equivalently apply thereto. For instance, networks other than a LAN can be implemented including, for instance, a wide area network (WAN). Further, virtual networks other than a VLAN can be implemented, such as any type of software-defined network. Of course, other types of facilities are also possible. For instance, the facility can be an office space or an enterprise, where the endpoints 112 can include personal user devices (e.g., smartphones, tablets, laptops, etc.). In another illustration, the facility can be healthcare facility, where the endpoints can be healthcare systems and devices such as nurse call systems, ventilators, telemetry devices, etc.

Figure 2:
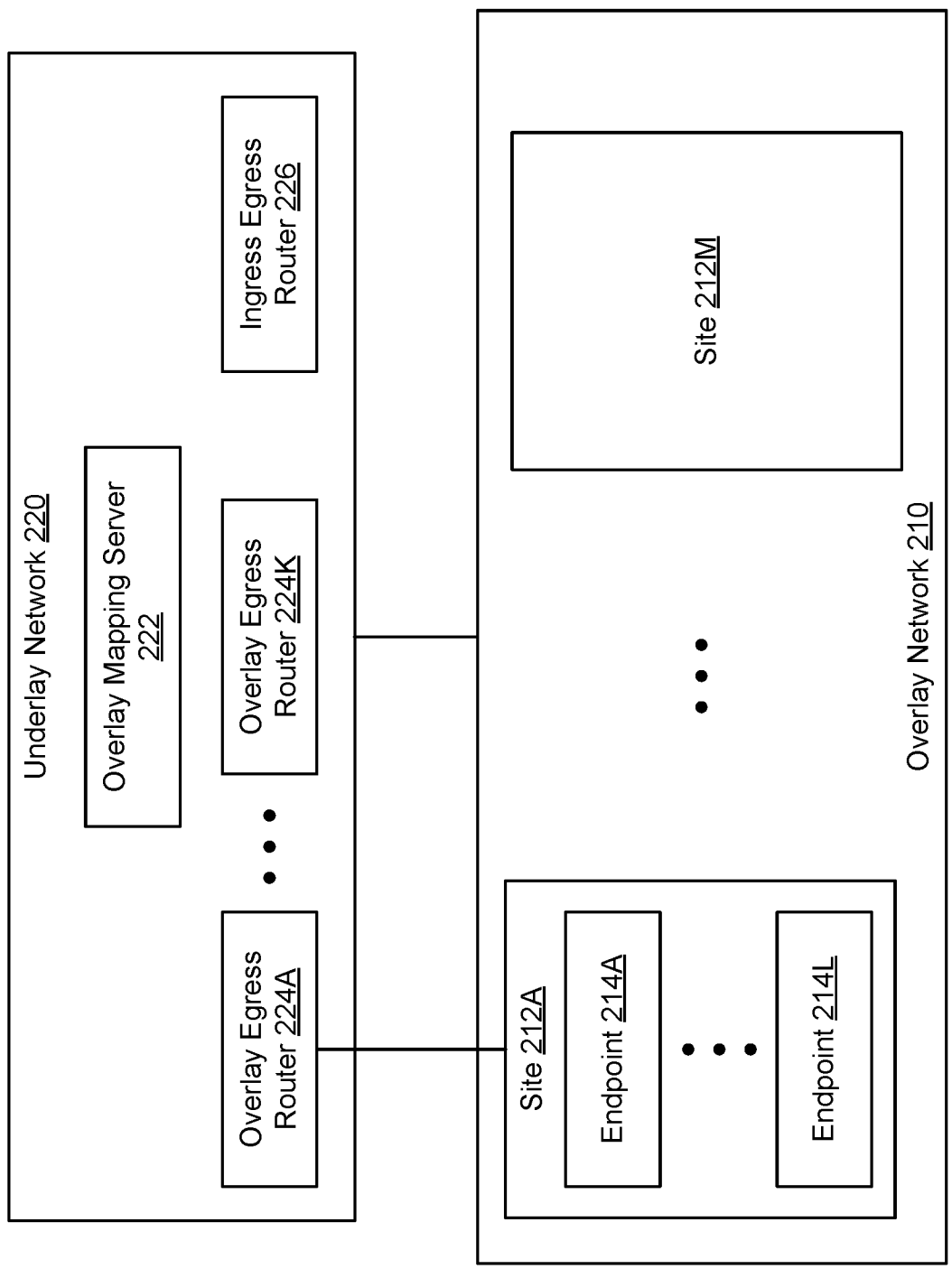
FIG. 2 illustrates an example of a computer network that includes an overlay network and an overlay network, according to embodiments of the present disclosure.

FIG. 2 illustrates an example of a computer network that includes an overlay network 210 and an underlay network 220, according to embodiments of the present disclosure. The overlay network 210 and the underlay network 220 are example components of the network 120 described in connection with FIG. 1.

In an example, the overlay network 210 can include a plurality of sites, illustrated as site 212A through site 212M. In turn, each site can include one or more endpoints. For instance, the site 212A includes endpoint 214A through endpoint 214L. A site can represent a physical network of endpoints or a logical grouping of endpoints to form a virtual network. The sites 212A through 212M can form one or more private networks (e.g., a LAN or a VLAN). Further, the sites 212A through 212K may share one or more network configuration parameters (e.g., a same subnet, an IP range, etc.). Each endpoint can be a host implemented as a physical device or a virtualized device executing on a virtualization device. Although not illustrated in FIG. 2, a site can include one or more physical and/or virtual network devices (e.g., access points, switches, routers, etc.) that interconnect the endpoints of the site and/or interconnect the site with another site(s) and/or with one or more devices external to the overlay network 210.

In an example, the underlay network 220 can interconnected physical computing resources on top of which at least some part of the overlay network 210 can be provided (e.g., virtualized) and/or usable to connect (e.g., tunnel or bridge) sites of the overlay network. For instance, the underlay network 220 can include an overlay mapping server 222 and a plurality of underlay network devices that implement a communication protocol such that traffic can be exchanged between endpoints of the overlay network 210 and with devices external to the overlay network 210. The underlay network 220 can process packet headers (e.g., encapsulate, decapsulate, add header information, remove header information) and tunnel traffic between sites. The communication protocol can rely on mapping information that maps an endpoint to an overlay network device. LISP is an example of such communication protocol, although it is possible to use other examples of the communication protocol (e.g., EVPN). In the interest of clarity of explanation, various embodiments of the present disclosure are described in connection with LISP. Nonetheless, the embodiments equivalently apply to the other examples of the communication protocol.

The overlay mapping server 222 can be implemented as a hardware server or a virtualized server that maintains the global mapping information for the different endpoints of the overlay network 210. Some of all of the overlay network devices can be physical network devices configured to provide the overlay functionalities described herein, or virtualized network devices that are executing on one or more virtualization devices and that are configured to provide the overlay functionalities. A network device can maintain local mapping information specific to routing paths it has previously learned and used.

In the use case of LISP, the overlay network devices form the global routing system. For example, the overlay network devices include a number of overlay egress routers (which can be referred to as egress traffic routers (ETRs)), illustrated in FIG. 2 as overlay egress router 224A through overlay egress router 224K. The overlay network devices also include a number of ingress traffic routers (which can be referred to as ingress traffic routers (ITRs)), illustrated as an ingress traffic router 226. Also, in the use case of LISP, the mapping information of an end point includes two namespaces rather than a single IP address: an endpoint identifier (EID) assigned to the endpoint and a routing locator (RLOC) assigned to an overlay network device that is configured to manage (e.g., route) traffic of the endpoint. The EID can be an IP address of the endpoint, whereas the RLOC can be an IP address of the overlay network device.

In the illustration of FIG. 2, the overlay egress router 224A is responsible for the site 212A. Accordingly, mapping information for the endpoint 214A includes the EID of the endpoint 214A and the RLOC of the overlay egress router 224A. Similarly, mapping information for the endpoint 214L includes the EID of the endpoint 214L and the RLOC of the overlay egress router 224A. Additional information can be included in the mapping information, such as an identifier of the site 212A (e.g., an identifier of the relevant subnet and/or an IP range identifier).

Figure 3:
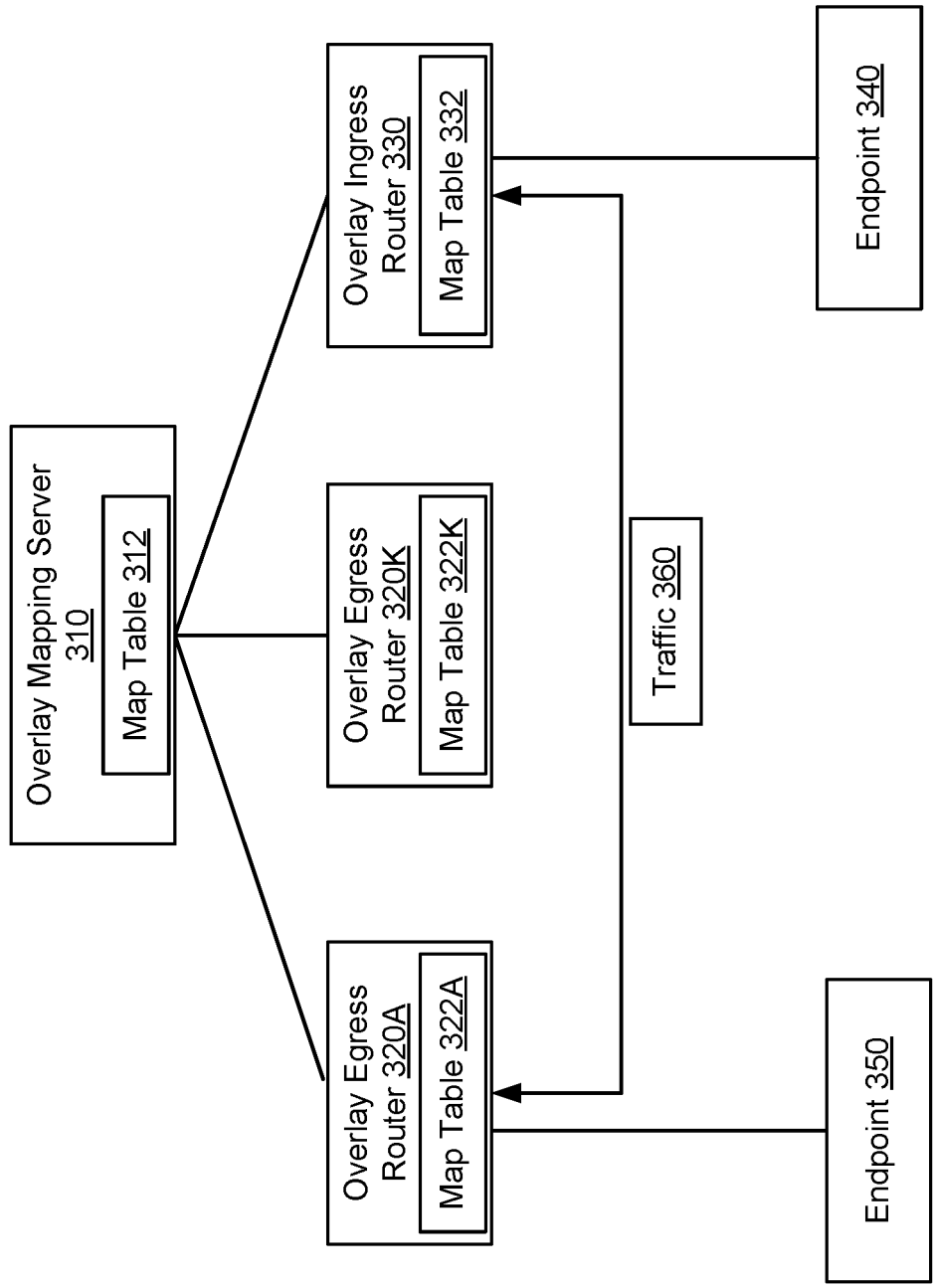
FIG. 3 illustrates an example of a traffic exchange in a computer network, according to embodiments of the present disclosure.

FIG. 3 illustrates an example of a traffic exchange in a computer network, according to embodiments of the present disclosure. In the illustration of FIG. 3, the computer network includes an overlay mapping server 310, an overlay egress router 320A, an overlay egress router 320K, and an overlay ingress router 330, which are examples of the overlay mapping server 222, the overlay egress router 224A, the overlay egress router 224K, and the overlay ingress router 226, respectively, of FIG. 2. The computer network also includes an endpoint 340 that sends traffic to an endpoint 350. These two endpoints can belong to an overlay network (e.g., the overlay network 210) and be parts of one or more sites.

The overlay mapping server 310 can store a map table 312 that includes entries corresponding to the different endpoints and that represent global mapping information. For instance, the map table 312 indicates that the endpoint 350 can be reached via the overlay egress router 320A (e.g., egress traffic thereto can be routed via the overlay egress router 320A), whereby the corresponding entry in the map table 312 includes the EID of the endpoint 340 and the RLOC of the overlay egress router 320A. In comparison, the map table 312 indicates that the endpoint 340 can be reached via another overlay egress router (e.g., via the overlay ingress router 330, in which this router 330 can be referred to as a tunnel router (xTR)). The map table 312 can be cached by the overlay mapping server 310 (or stored in a different type of data storage). The map table 312 can also be stored as a mapping database, with the EIDs as keys and the RLOCs as values.

In comparison, the overlay ingress router 330 can store a map table 332 that includes entries corresponding to network paths that the overlay ingress router 330 has previously learned and used. Such entries represent local mapping information. For instance, the overlay ingress router 330 may have previously sent traffic to the endpoint 350 via the overlay egress router 320A. In this case, the map table 332 indicates that the endpoint 350 can be reached via the overlay egress router 320A, whereby the corresponding entry in the map table 332 includes the EID of the endpoint 350 and the RLOC of the overlay egress router 320A. The map table 332 can be cached by the overlay ingress router 330 (or stored in a different type of data storage). The map table 332 can also be stored as a mapping database, with the EIDs as keys and the RLOCs as values. In an example, the overlay ingress router 330 maintains the map table 332 by requesting and receiving, from the overlay mapping server 310, the relevant entries of the map table 312, where these entries are specific to the traffic that the overlay ingress router 330 is handling.

Similarly, the overlay egress router 320A and the overlay egress router 322K can store a map table 322A and a mapping table 322K, respectively, where each of these mapping tables 322A and 322K includes entries corresponding to network paths that the corresponding overlay egress router 322A or 322K has previously learned and used. Such entries represent local mapping information. For instance, the overlay egress router 322A may have previously received, from the overlay ingress router 330, traffic originating from the endpoint 340 (and, possibly, destined to the endpoint 350). In this case, the map table 322A indicates that the endpoint 340 can be reached via the overlay ingress router 330, whereby the corresponding entry in the map table 322A includes the EID of the endpoint 340 and the RLOC of the overlay ingress router 330. The map table 322A can be cached by the overlay egress router 322A (or stored in a different type of data storage). The map table 322A can also be stored as a mapping database, with the EIDs as keys and the RLOCs as values. In an example, the overlay egress router 322A maintains the map table 322K based on traffic it receives (rather than requesting and receiving, from the overlay mapping server 310, the relevant entries of the map table 312, although it may be possible to do so). In the case of a tunnel router, this router may maintain its map table by learning the mapping information from ingress traffic thereto and by requesting the mapping information from the overlay mapping server 310 for egress traffic therefrom.

To illustrate, consider the example of traffic 360 originating from the endpoint 340 and destined to the endpoint 350. This traffic 360 can include a packet that includes a header and a payload. The header can include a source IP address of the endpoint 340, a destination IP address of the endpoint 350. The overlay ingress router 330 receives and processes this packet. The processing includes determining, based on its map table 332, the RLOC that corresponds to the destination IP address. In this illustration, the RLOC is the IP address of the overlay egress router 320. Next, the overlay ingress router 330 encapsulates the packet with LISP encapsulation. For instance, an additional header is added to the packet, where the header includes the source IP address of the overlay ingress router 330 and the destination IP address of the overlay egress router 320A (e.g., the determined RLOC). In turn, the overlay egress router 320A receives the LISP encapsulated packet, decapsulates it, and forwards the original packet to the endpoint 350.

The above illustration is a simplified example of a packet routing. Additional encapsulation information (e.g., header information) can be used in the case of virtualized networks hosted on physical networks, such that the packet can be routed via the physical networks to reach the proper virtual destination (e.g., the header information can include physical and virtual IP addresses and identify different encapsulation protocols to facilitate the processing of the packet).

Furthermore, the above illustration assumes that the map table 332 includes the relevant entry to route the traffic 360. However, in certain situations (e.g., the endpoint 350 is a silent endpoint), this entry may not be available. In such situations, a mapping information learning procedure can be executed as further described in the next figures.

Figure 4:
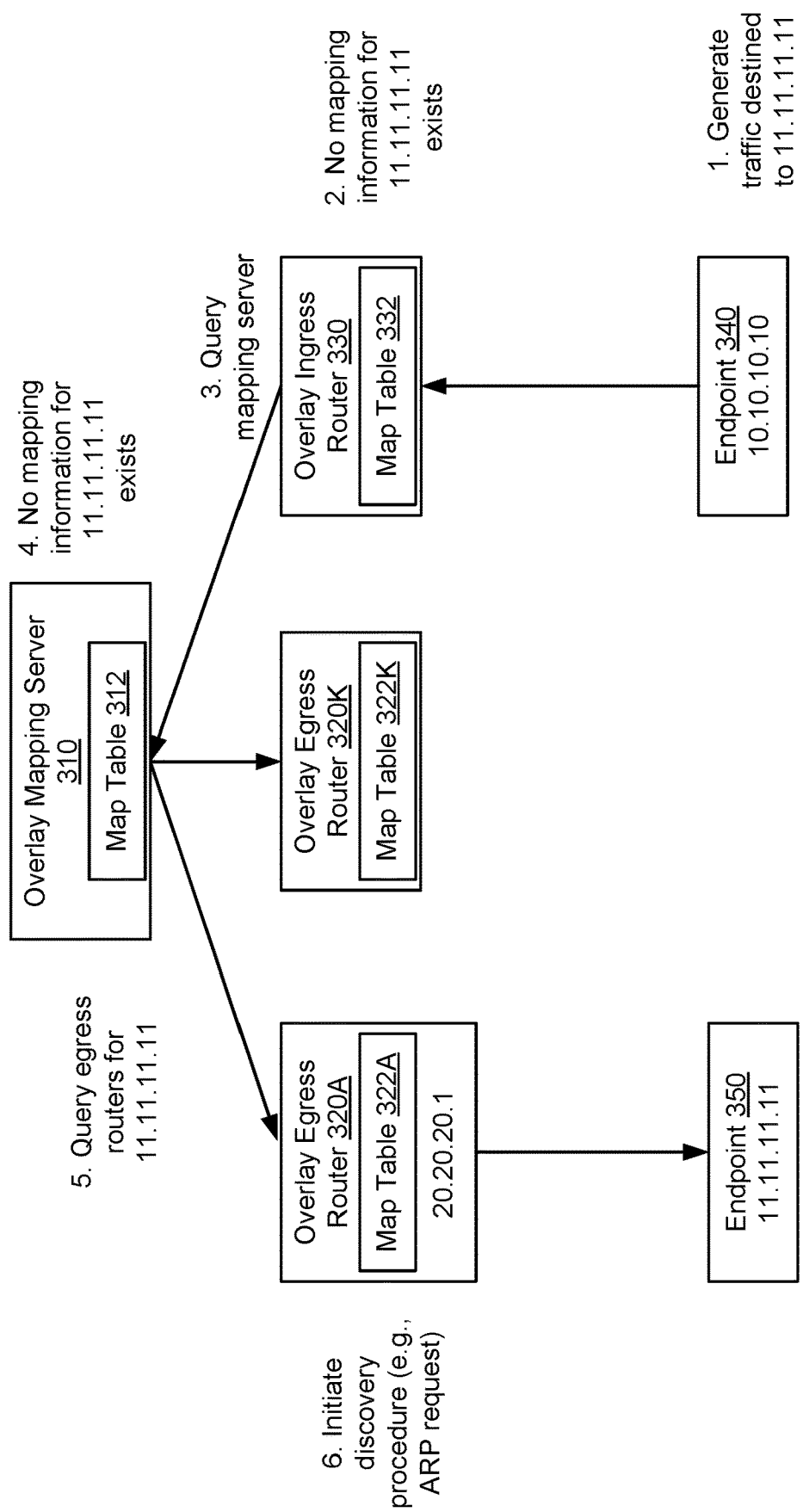
FIG. 4 illustrates an example of a first part of a mapping information learning procedure usable in a computer network, according to embodiments of the present disclosure.

FIG. 4 illustrates an example of a first part of a mapping information learning procedure usable in a computer network, according to embodiments of the present disclosure. In the interest of clarity of explanation, the figure is described by referring to the same component of the computer environment shown in FIG. 3. Here, the mapping information to send traffic to the endpoint 350 is not available to the overlay ingress router 330 and, thus, the overlay ingress router 330 has to learn this mapping information and store it as an entry in its map table 332. Further, the endpoint 350 is a silent endpoint and, thus, the overlay mapping server 310 has to also learn this mapping information.

As illustrated, the endpoint 340 generates traffic destined to the endpoint 350. For example, the traffic includes a packet where its destination IP address is 11.11.11.11 (e.g., an example IP address of the endpoint 350), and its source IP address is 10.10.10.10 (e.g., an example IP address of the endpoint 340). The overlay ingress router 330 receives the traffic and determines that no mapping information exists for the endpoint 350. For instance, the overlay ingress router 330 determines the destination IP address from the packet and performs a look-up of its mapping table 332 using this IP address as a key. The result of the look-up is a null indicating that the overlay ingress router 330 has not learned and stored the mapping information corresponding to 11.11.11.11.

Because the mapping information for the endpoint 350 is not available, the overlay ingress router 330 requests this information from the overlay mapping server 350. For instance, the overlay ingress router 330 sends a query to the overlay mapping server 310, where the query includes the IP address of the endpoint 350. Additional information can be included in the query, such as information about the site to which the endpoint 350 belongs (e.g., an identifier of the LISP site, subnet information, IP address range information, tenant information, etc.). In response, the overlay mapping server 310 also determines that no mapping information exists for the endpoint 350. For instance, the overlay mapping server 310 performs a look-up of its mapping table 312 using the IP address as a key. The result of the look-up is a null indicating that the overlay mapping server 310 has not learned and stored the mapping information corresponding to 11.11.11.11. Rather than returning a null query result to the overlay ingress router 330, here the overlay mapping server 310 attempts to learn the mapping information. Only if it cannot learn this missing mapping information does the overlay mapping server 310 return a null query result. The learning can be implemented by executing a mapping information learning procedure.

In an example, the mapping information learning procedure involves the overlay mapping server 310 querying one or more of the overlay egress routers 320A through 320K about the endpoint 350. Each of these overlay egress routers can have an existing, established connection to the overlay mapping server 310 (e.g., a transmission control protocol (TCP) connection thereto). As such, the query can include a broadcast, multicast, or unicast (sequential or in parallel) message(s) to the overlay egress router(s), where the message(s) include the IP address of the endpoint 350. Additional information can be included in the message(s), such as the information about the site to which the endpoint 350 belongs. Although here the figure shows querying of overlay egress routers, the querying may not be limited to these routers only. For instance, overlay ingress routers other than the overlay ingress router 330 can be queried too.

Each of the queried routers receives the query. If it has no relevant information about the endpoint 350 (e.g., as in the case of the overlay egress router 320K), the router does not respond to the query or responds back with a null query result. If it has the relevant information (as in the case of the overlay egress router 320A), the does respond back to the overlay mapping server 310 indicating the relevant information. Different mechanisms can be used to determine whether the router may have the relevant information. In one example, the router extracts the additional information included in the query and determines, based on this additional information, whether the endpoint 350 can be potentially reached via this router. For instance, if the additional information indicates that the endpoint 350 is in a site, a subnet, or a tenant that may be served by the router, then this router determines that it may have relevant information. Otherwise, the router determines that it has no relevant information. In the case that relevant information can potentially be determined, the router can initiate an endpoint discovery procedure, such as an ARP procedure. In the illustration of FIG. 4, the overlay egress router 320A does so because it has determined that it may potentially discover the endpoint 350, whereas the overlay egress router 320K does not initiate such a procedure because it has determined that it cannot potentially discover the endpoint 350.

Continuing with the illustration of FIG. 4, the overlay egress router 320A initiates the discovery procedure by, for instance, sending a discovery request. In the case of using an ARP procedure, the discover request can include an ARP request, where the ARP request is broadcasted. This ARP request includes the IP address of the endpoint 350 (e.g., 11.11.11.11).

Figure 5:
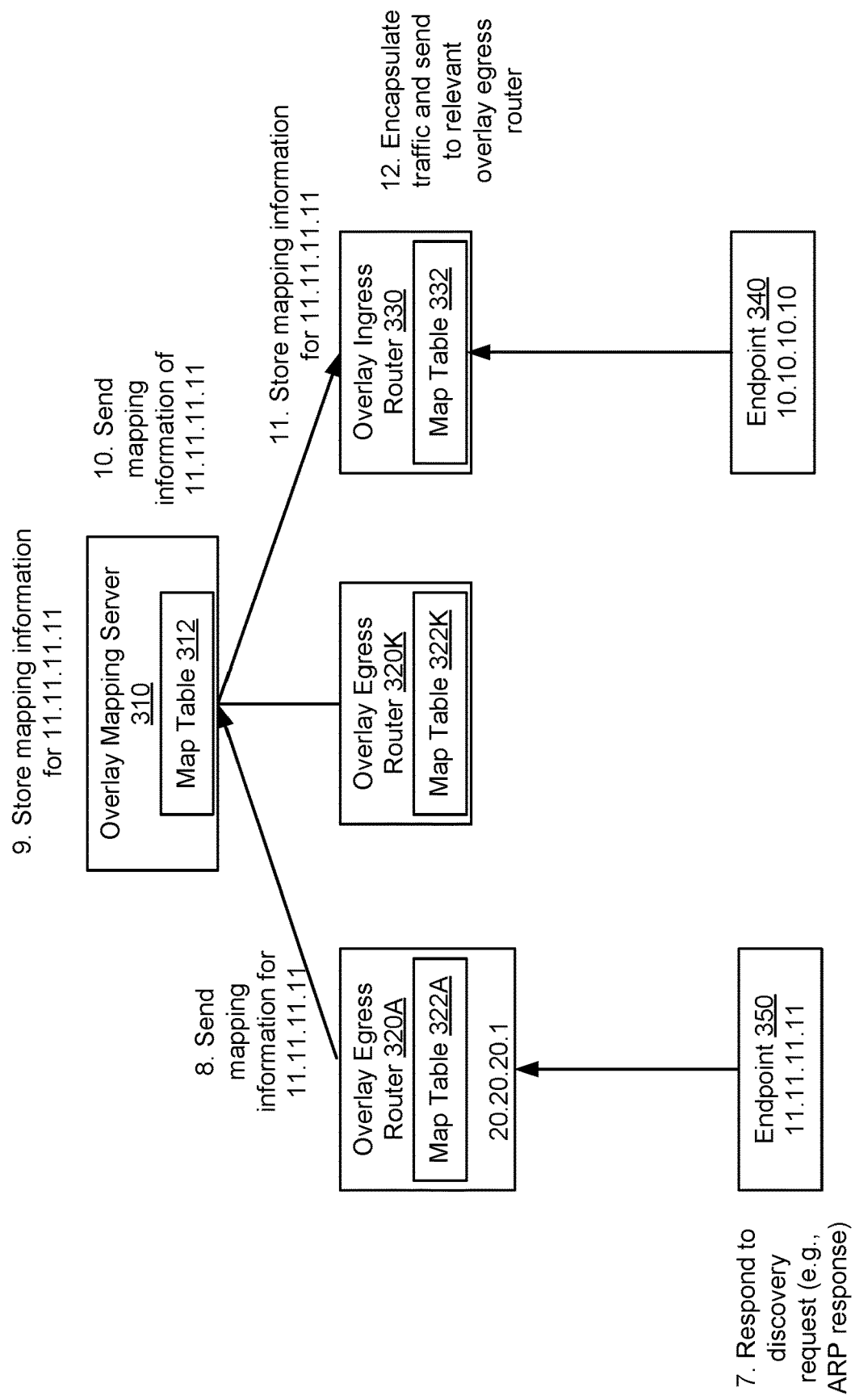
FIG. 5 illustrates an example of a first second of a mapping information learning procedure usable in a computer network, according to embodiments of the present disclosure.

FIG. 5 illustrates an example of a first second of a mapping information learning procedure usable in a computer network, according to embodiments of the present disclosure. In the interest of clarity of explanation, the figure is described by referring to the same component of the computer environment shown in FIG. 3 and continues with the illustration described in connection with FIG. 4.

As illustrated, the endpoint 350 responds to the discovery request because it has the same IP address as the one identified in the discover request. In the case of the ARP procedure, the discovery response can include an ARP response that identifies a media access control (MAC) address of the endpoint 350. The overlay egress router 320A receives the discovery response and sends the relevant information to the overlay mapping server 310. The relevant information can include the mapping information itself, an indication that the endpoint 350 was discovered (or, equivalently, that the endpoint 350 can be reached via the overlay egress router 320A), and/or LISP registration information.

In turn, the overlay mapping server 310 stores the mapping information for the endpoint 350. For instance, an entry is added to the map table 312. This entry can include the EID of the endpoint 350 (e.g., its IP address 11.11.11.11) and the RLOC of the overlay egress router 320A (e.g., its IP address illustrated as 20.20.20.1). Additional information can also be included, such as any additional information available from the LISP registration information.

Further, the overlay mapping server 310 sends the mapping information of the endpoint 350 to the overlay ingress router 330. This mapping information can be sent as a response to the query of the overlay ingress router 330 and can include some (e.g., at least the RLOC) or all of the information stored in the entry that corresponds to the IP address of the endpoint 350. Next, the overlay ingress router 330 stores the mapping information (e.g., by adding the relevant entry to its map table 332) and encapsulates and sends the traffic to the overall egress router 320A. As described in connection with FIG. 3, the encapsulation is based on the mapping information. For instance, the overlay ingress router 330 adds the IP address of the overlay egress router 320A (e.g., 20.20.20.1) as the destination and its own IP address as the source.

In the illustration of FIGS. 4 and 5, the overlay egress router 320K does not have relevant information about the endpoint 350 and does not receive the mapping information of this endpoint 350. Variations to the illustration of FIGS. 4 and 5 exist. For instance, the overlay mapping server 310 can use a push mechanism to send the mapping information to the overlay egress router 320K such that this router 320K can update its map table 322K. Additionally or alternatively, the overlay egress router 320A can send the mapping information (or at least the RLOC portion thereof) to the overlay egress router 320K upon the discovery of the endpoint 350.

Figure 6:
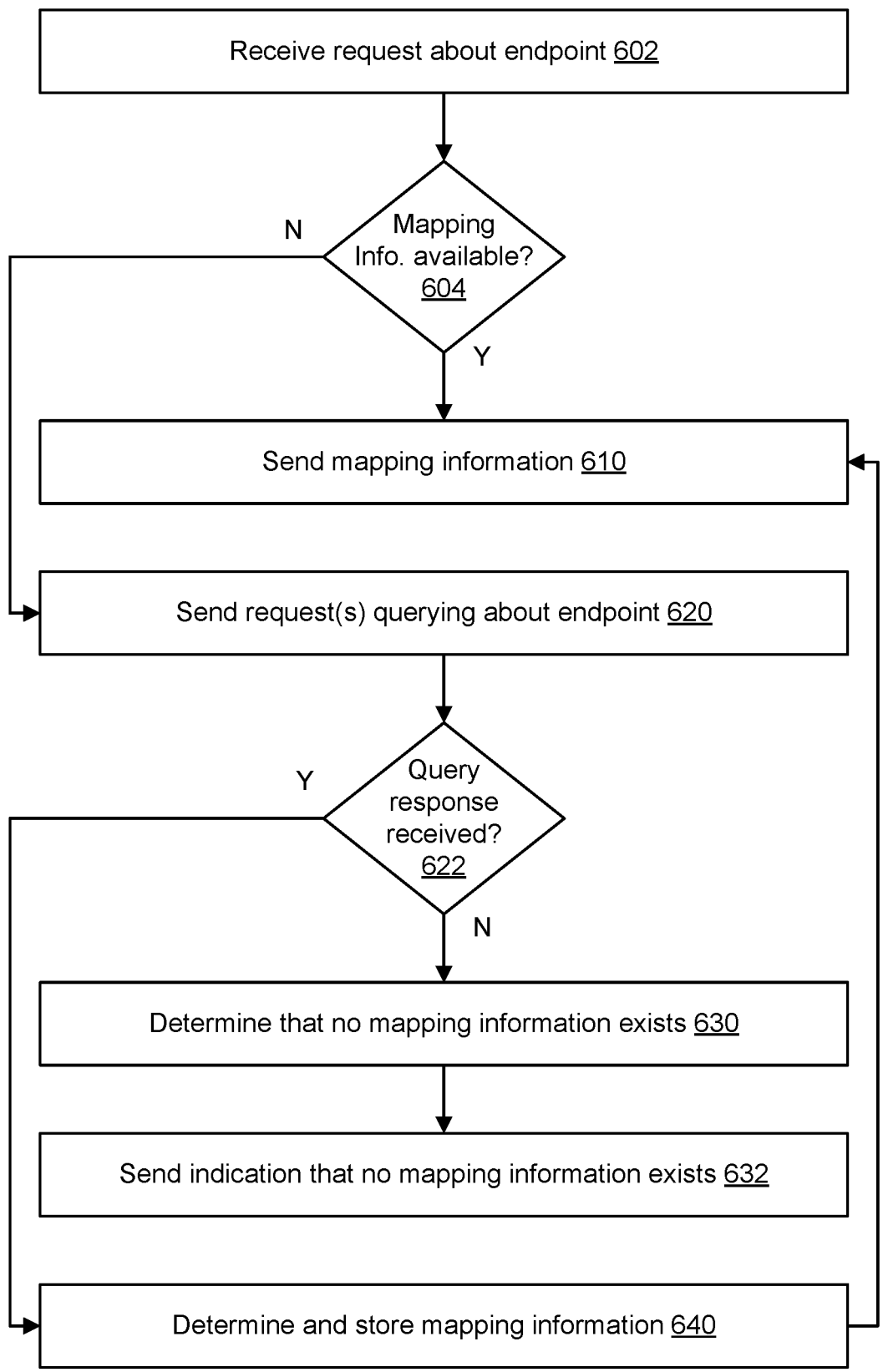
FIG. 6 illustrates an example of a flow that an overlay mapping server can implement to determine mapping information of an endpoint, according to embodiments of the present disclosure.
Figure 7:
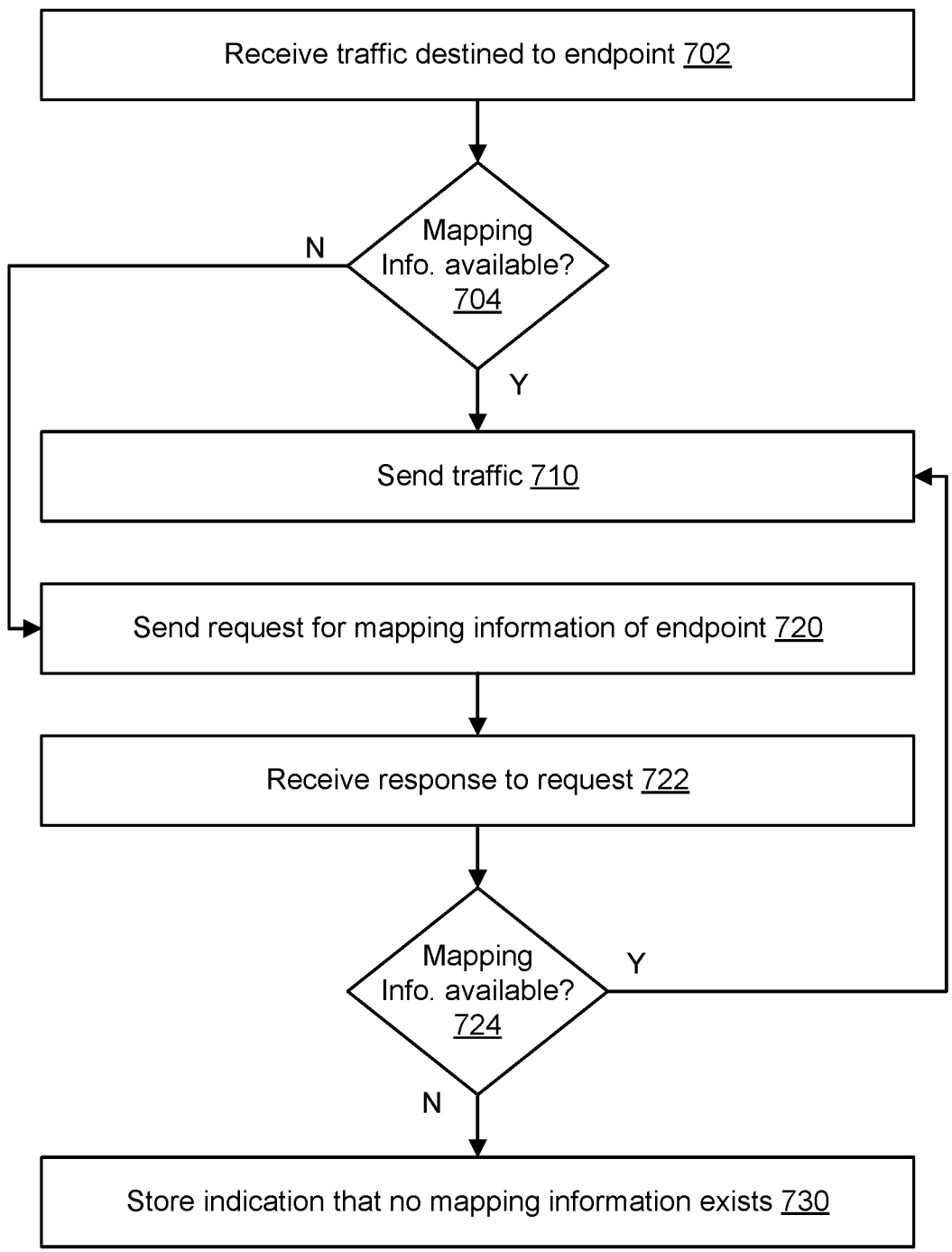
FIG. 7 illustrates an example of a flow that an overlay ingress router can implement to determine mapping information of an endpoint, according to embodiments of the present disclosure.
Figure 8:
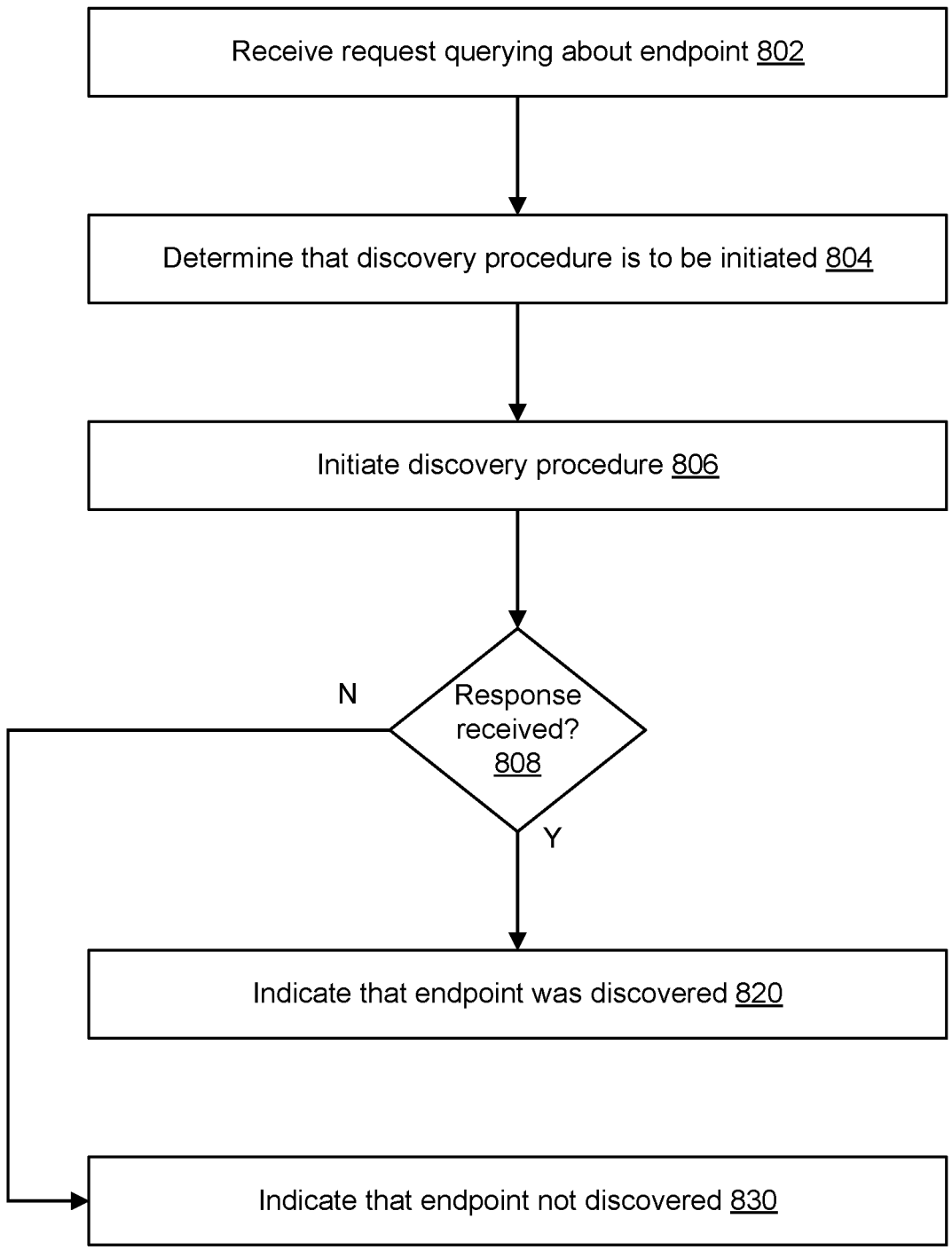
FIG. 8 illustrates an example of a flow that an overlay egress router can implement to determine information about an endpoint, according to embodiments of the present disclosure.

FIGS. 6-8 illustrate example flows for providing overlay functionalities. Operations of each flow can be performed by a corresponding computer system, such as an overlay mapping server or a network device (e.g., an overlay ingress router or an overlay egress router). Some or all of the instructions for performing the operations of a flow can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations of the flow. Each circuitry or code in combination with the relevant processor(s) represent a means for performing a respective operation(s) of the flow. While the operations of a flow are illustrated in a particular order, it should be understood that no particular order is necessary and that one or more operations may be omitted, skipped, performed in parallel, and/or reordered. These flows can also be in conjunction with each other or independently of each other.

FIG. 6 illustrates an example of a flow that an overlay mapping server (e.g., the overlay mapping server 310) can implement to determine mapping information of an endpoint, according to embodiments of the present disclosure. In an example, the flow starts at operation 602, where the mapping server receives a request about an endpoint (e.g., the endpoint 350). For instance, the request can be received from a network device, such as an overlay ingress router (e.g., the overlay ingress router 330), can identify the endpoint, and can correspond to a query for mapping information that may be stored by the overlay mapping server in association with the endpoint. In a LISP use case, the request can be a LISP map request indicating the need for a mapping of an EID of the endpoint. The LISP map request can include information about an EID prefix, an EID prefix length, and an address family identifier (AFI) that to which the endpoint belongs, a RLOC address of the overlay ingress router, and the RLOC AFI to which the RLOC address belongs.

In an example, the flow may include operation 604, where the overlay mapping server determines whether the mapping information is available for the endpoint. For instance, the overlay mapping server may look up mapping information stored for a plurality of endpoints. Such information can be stored in a table at a local memory (e.g., cache or some other data storage) of the overlay mapping server. The look-up may use an identifier of the endpoint (e.g., its EID or a portion thereof). If the look-up result indicates that the mapping information already exists, the flow may proceed to operation 610. Otherwise, operation 620 may follow operation 604.

In an example, the flow may include operation 610, where the overlay mapping server may send the mapping information of the endpoint. For instance, this information is sent to the network device in a response to the request. In the LISP use case, the response can be a LISP map reply that includes the requested EID-to-RLOC mapping information. In the LISP map reply message, the destination address is copied from the source address of the LISP map request message. The LISP map reply may include information about the EID and the RLOC along with the respective AFI. It can also include a record time-to-live (TTL) field. The value of this field indicating a time period (e.g., in minutes) during which the network device stores the mapping (e.g., in cache). Once the time period expires, the mapping information can be immediately removed.

In an example, the flow may include operation 620, where the overlay mapping server may send one or more requests querying about the endpoint. For instance, a query that identifies the endpoint (e.g., includes its EID) is sent to one or more network devices that may manage traffic to the endpoint (e.g., one or more overlay egress routers). The query can be sent in a broadcast message, a multicast message, or a unicast message and cause the recipient network device to determine whether a discovery procedure is to be performed and, if so, to perform such a procedure. In the LISP use case, the query can be a control plane message that includes, among other things, information about the EID, such as a portion or the entire EID, information about the EID prefix, and/or the EID prefix length. The query can also include additional information related to the endpoint, overlay ingress router, and/or the overlay mapping server, such as the AFI to which the endpoint belongs, the RLOC address of the overlay ingress router, the RLOC AFI to which the RLOC address belongs, and/or an identifier of the overlay mapping server. In addition, upon sending the query, the overlay mapping server can start a timer (e.g., a count down timer or a count up timer).

In an example, the flow may include operation 622, where the overlay mapping server determines whether a response to the query is received from any of the queried network devices. If no response is received, the flow may process to operation 630. Otherwise, operation 640 may follow operation 622. Different techniques may exist to determine whether the response is received. In one example technique, a null response (e.g., one that indicates that the endpoint was not discovered) is considered as a no response. As such, if only null responses are received, the overlay mapping server determines that no mapping information exists for the endpoint per operation 630. Otherwise, a response is received and can contain the relevant information to determine the mapping information per operation 640. In another example technique, the timer can be used. Upon the timer reaching a value (e.g., a countdown timer reaching zero or a count-up timer reaching a predefined threshold time), the overlay mapping server determines if only null responses are received or that no responses at all were received. If so, the overlay mapping server determines that no mapping information exists for the endpoint per operation 630. Otherwise, a response is received before an expiration of the timer and can contain the relevant information to determine the mapping information per operation 640. In the LISP use case, a response indicating that the endpoint was discovered (e.g., a positive response) can be a LISP map register message. This message can request the overlay mapping server to register the EID with the RLOC of the network device that sent the positive response (e.g., the overlay egress router 320A).

In an example, the flow may include operation 630, where the overlay mapping server determines that no mapping information exists for the endpoint. For instance, the overlay mapping server can determine that this endpoint is not reachable via any of the overlay egress routers. The overlay mapping server may store (e.g., in its map table) an indication that no mapping information exists for the endpoint. Further, the overlay mapping server may start a timer, such that during a time period (e.g., before an expiration of the timer), the indication remains valid. While the indication is valid, if the overlay mapping server receives another request for mapping information of the endpoint, the overlay mapping server can use the indication to either ignore the request and not send a response or send a null response indicating that no mapping information is available. In other words, during this time period, the overlay mapping server may avoid the need to execute another mapping information learning procedure to learn mapping information of the endpoint.

In an example, the flow may include operation 632, where the overlay mapping server may send an indication that no mapping information exists for the endpoint. For instance, the indication is sent to the requesting network device (e.g., the overlay ingress router) as a response to its request. In the LISP use case, this response can be a LISP reply message that includes an empty locator set. This kind of reply message represents a negative map reply message.

In an example, the flow may include operation 640, where the overlay mapping server determines and stores the mapping information of the endpoint. For instance, the mapping information is determined from the received response of a queried network device (e.g., one of the queried overlay egress routers). In the LISP use case, the mapping information can include the EID of the endpoint and the RLOC of the overlay egress router that responded. Other information can additionally be included, such as the RLOC AFI. Operation 640 is followed by operation 610, where the mapping information is sent to the requesting network device (e.g., the overlay ingress router).

FIG. 7 illustrates an example of a flow that an overlay ingress router (e.g., the overlay ingress router 330) can implement to determine mapping information of an endpoint, according to embodiments of the present disclosure. In an example, the flow may start at operation 702, where the overlay ingress router receives traffic destined to an endpoint (e.g., the endpoint 350). For instance, the traffic originates from another endpoint (e.g., the endpoint 340) and includes header information that indicates that the endpoint is the destination.

In an example, the flow may include operation 704, where the overlay ingress router determines whether mapping information is available for the endpoint. For instance, the overlay ingress router may look up mapping information stored for a plurality of endpoints. Such information can be stored in a table at a local memory (e.g., cache or some other data storage) of the overlay ingress router. The look-up may use an identifier of the endpoint (e.g., its EID or a portion thereof). If the look-up result indicates that the mapping information already exists, the flow may proceed to operation 710. Otherwise, operation 720 may follow operation 704.

In an example, the flow may include operation 710, where the overlay ingress router sends the traffic to the endpoint based on the mapping information. For instance, the overlay ingress router determines, from the mapping information, the RLOC of the overlay egress router via which the traffic is to be routed to the endpoint. Further, the overlay ingress router encapsulates the traffic by adding header information identifying at least the RLOC as a destination. The encapsulated traffic is then forwarded to the overlay egress router based on the added header information.

In an example, the flow may include operation 720, where the overlay ingress router sends a request for mapping information of the endpoint. This request can be similar to the request described in connection with operation 602. In the LISP use case, the request can be a LISP map request.

In an example, the flow may include operation 722, where the overlay ingress router receives a response to the request. The response can be a negative response, similar to the response described in connection with operation 632, indicating that the mapping information is not available. Alternatively, the response can be a positive response, similar to the response described in connection with operation 610, indicating the mapping information. In the LISP use case, the response can be a LISP map reply.

In an example, the flow may include operation 724, where the overlay ingress router determines whether the mapping information is available based on the response. In the case of the negative response, the overlay ingress router determines that the mapping information is not available. If so, the flow may proceed to operation 730. In the case of the positive response, the overlay ingress router determines that the mapping information is not available. If so, the flow may loop back to operation 710. Here, the overlay ingress traffic can determine the mapping information from the positive response and use this mapping information for the encapsulation of the traffic. Additionally, the overlay ingress traffic may include an entry in its map table, where this entry may include some or all of the mapping information.

In an example, the flow may include operation 730, where the overlay ingress router may store an indication that no mapping information exists (or, more generally, is available from the overlay mapping server) for the endpoint. The negative response that causes operation 730 to be followed may be a negative LISP map reply. This reply may include a TTL field. The value of this field indicates a time period (e.g., in minutes) during which the ingress traffic router stores the indication that no mapping information exists (e.g., in cache). During the time period, the ingress overlay router can be prohibited from requesting mapping information from the overlay mapping server for the endpoint again. Once the time period expires, the mapping information can be requested again. As such, the overlay ingress router can check to see of the indication is still valid (e.g., whether the time period has expired or not) and accordingly, requests the mapping information or determines that it is currently prohibited from doing so.

FIG. 8 illustrates an example of a flow that an overlay egress router (e.g., the overlay egress router 320A) can implement to determine information about an endpoint (e.g., the endpoint 350), according to embodiments of the present disclosure. The flow may start at operation 802, where the overlay egress router receives a request querying about an endpoint. For instance, the request is a query received from an overlay mapping server, where the query is similar to the query described in connection with operation 620. In the LISP use case, the query can be a control plane message that causes the overlay egress router to determine whether a discovery procedure, such as an ARP procedure, is to be initiated.

In an example, the flow may include operation 804, where the overlay egress router determines that the discovery procedure is to be initiated based on information from the query. For instance, the query can include information indicating that the endpoint is potentially reachable via the endpoint. In the LISP use case, this information can be an EID AFI and/or an RLOC AFI. By determining that it is also associated with the EID AFI and/or the RLOC AFI, the overlay egress router determines that the endpoint can potentially be reached via itself. In the opposite situation, where the potential to be reachable via the overlay egress router is not determined, the overlay egress router can either not respond to the query or can send a null response.

In an example, the flow may include operation 806, where the overlay egress router initiates the discovery procedure. For instance, the overlay egress router determines the IP address of the endpoint from the query and broadcasts an ARP request message that includes the IP address.

In an example, the flow may include operation 808, where the overlay egress router determines whether a discovery response is received. If so, the flow may proceed to operation 820. Otherwise, the flow may proceed to operation 830.

The discovery response may be an ARP response and can be received within a time period of sending the ARP request if the endpoint is actually reachable via the overlay egress router.

In an example, the flow may include operation 820, where the overlay egress router indicates that the endpoint was discovered. This indication can be sent in a response to the query of the overlay mapping server. The response can be similar to the positive response described in connection with operation 622 and can be, in the LISP use case, a LISP map register message.

In an example, the flow may include operation 830, where the overlay egress router indicates that no endpoint was discovered. This indication can be a null response sent to the overlay mapping server or no response at all to the query of the overlay mapping server.

Although the flows of FIGS. 6-8 are described in connection with an overlay mapping server, an overlay ingress router, and an overlay egress router, non-overlay systems can also be used. In particular, the flows of FIGS. 6-8 equivalently apply with a mapping server, an ingress router, and an egress router without any or all of such systems being overlay systems.

Figure 9:
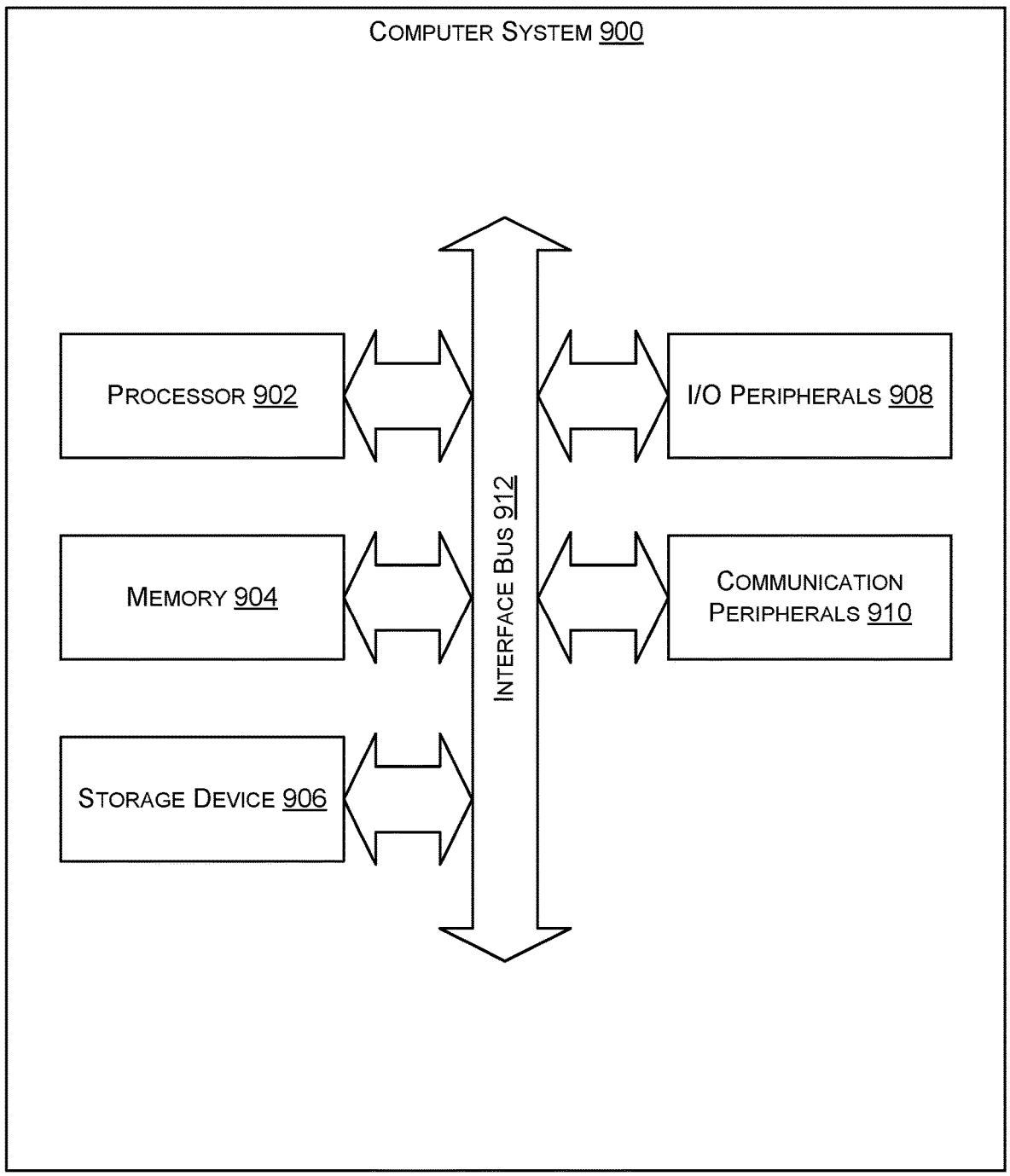
FIG. 9 illustrates example components of a computer system, in accordance with embodiments of the present disclosure.

FIG. 9 illustrates example components of a computer system 900, in accordance with embodiments of the present disclosure. The computer system 900 can be used a node in a computer network, where this node provides one or more computing components of an underlay network of the computer network and/or one or more computing components of an overlay network of the computer network. Additionally or alternatively, the components of the computer system 900 can be used in an endpoint. Although the components of the computer system 900 are illustrated as belonging to a same system, the computer system 900 can also be distributed (e.g., between multiple user devices).

The computer system 900 includes at least a processor 902, a memory 904, a storage device 906, input/output peripherals (I/O) 908, communication peripherals 910, and an interface bus 912. The interface bus 912 is configured to communicate, transmit, and transfer data, controls, and commands among the various components of the computer system 900. The memory 904 and the storage device 906 include computer-readable storage media, such as RAM, ROM, electrically erasable programmable read-only memory (EEPROM), hard drives, CD-ROMs, optical storage devices, magnetic storage devices, electronic non-volatile computer storage; for example, Flash® memory, and other tangible storage media. Any of such computer-readable storage media can be configured to store instructions or program codes embodying aspects of the disclosure. The memory 904 and the storage device 906 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computer system of, for example, a cloud network or a data center. The I/O peripherals 908 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 908 are connected to the processor 902 through any of the ports coupled to the interface bus 912. The communication peripherals 910 are configured to facilitate communication between the computer system 900 and other systems over a communications network and include, for example, a network interface controller, modem, wireless and wired interface cards, antenna, and other communication peripherals The computer system 900 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random-access memory ("RAM") or read-only memory ("ROM"), as well as removable media devices, memory cards, and/or flash cards.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices, such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information, such as computer-readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a," "an," and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language, such as the phrase "at least one of X, Y, or Z," unless specifically stated otherwise, is intended to be understood within the context as used in general to present that an item and/or term may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. A method implemented by a mapping server, the method comprising:
   receiving, from a first network device storing a first map table, a first request for mapping information associated with an endpoint such that the first network device can send traffic to the endpoint, the first request received based at least in part on the first map table lacking the mapping information;
   determining, based at least in part on the first request, that the mapping information is lacking from a second map table of the mapping server, the second map table being different than the first map table;
   sending, to a second network device based at least in part on the mapping server determining that the mapping information is lacking from the second map table, a second request indicating the endpoint, the second request causing the second network device to discover the endpoint;
   receiving, from the second network device, an indication of a discovery of the endpoint by the second network device; and
   sending, to the first network device, a response to the first request, the response indicating the mapping information, the mapping information indicating that the traffic can be sent to the endpoint via the second network device.

2. The method of claim 1, wherein:
   receiving the first request comprises receiving a location identifier separation protocol (LISP) map request message, wherein the first network device comprises an ingress traffic router;
   sending the second request comprises sending a LISP control plane message querying the second network device about the endpoint, wherein the second network device comprises an egress router, and wherein the LISP control plane message is sent based at least in part on a determination that that no mapping information is stored for the endpoint in second mapping information stored in the second map table for a plurality of endpoints;
   receiving the indication comprises receiving a LISP map register message; and
   sending the response comprises sending a LISP map reply message.

3. The method of claim 1 further comprising:
   starting a timer based at least in part on the second request being sent;
   determining that the indication is received prior to an expiration of the timer; and
   storing the mapping information in the second map table.

4. The method of claim 1 further comprising:
querying, based at least in part on the determining that no mapping information is stored for the endpoint, a plurality of network devices about the endpoint, wherein the querying comprises sending the first request, and wherein each one of the plurality of network devices has an established data connection with the mapping server.

5. The method of claim 1 further comprising:
receiving, form a third network device, a third request for second mapping information associated with a second endpoint, wherein the third network device is the same as or different from the first network device;
sending, to the second network device, a fourth request indicating the second endpoint;
determining, based at least in part on the fourth request, that no mapping information is available for the second endpoint; and
sending, to the third network device, a second response indicating that no mapping information is available for the second endpoint.

6. The method of claim 5, wherein determining that no mapping information is available for the second endpoint comprises determining that no response to the fourth request is received from the second network device within a time period after the fourth request is sent.

7. The method of claim 5 further comprising:
causing the third network device to store an indication that no mapping information is available for the second endpoint, the indication prohibits the third network device to further request the second mapping information within a time period.

8. The method of claim 5 further comprising:
receiving, form the third network device, a fifth request for the second mapping information;
determining that the fifth request is received within a time period of sending the second response; and
determining that querying the second network device about the second endpoint is not to be performed based at least in part on the fifth request being received within the time period.

9. One or more non-transitory computer-readable storage media storing instructions that, upon execution on a mapping server, cause the mapping server to perform operations comprising:
receiving, from a first network device storing a first map table, a first request for mapping information associated with an endpoint such that the first network device can send traffic to the endpoint, the first request received based at least in part on the first map table lacking the mapping information;
determining, based at least in part on the first request, that the mapping information is lacking from a second map table of the mapping server, the second map table being different than the first map table;
sending, to a second network device based at least in part on the mapping server determining that the mapping information is lacking from the second map table, a second request indicating the endpoint, the second request causing the second network device to discover the endpoint;
receiving, from the second network device, an indication of a discovery of the endpoint by the second network device; and
sending, to the first network device, a response to the first request, the response indicating the mapping information, the mapping information indicating that the traffic can be sent to the endpoint via the second network device.

10. The one or more non-transitory computer-readable storage media of claim 9, wherein the operations further comprise:
querying, a plurality of network devices about the endpoint, wherein the querying comprises sending the first request in a unicast message to the second network device.

11. The one or more non-transitory computer-readable storage media of claim 9, wherein the operations further comprise:
sending, to a third network device based at least in part on a push mechanism, the mapping information, wherein the second network device and the third network device have an established data connection to the mapping server.

12. The one or more non-transitory computer-readable storage media of claim 9, wherein the first request identifies the endpoint and a network that includes the endpoint.

13. The one or more non-transitory computer-readable storage media of claim 12, wherein the second request causes the second network device to determine whether the second network device is associated with the network and to initiate a discovery procedure upon a determination that the second network device is associated with the network.

14. The one or more non-transitory computer-readable storage media of claim 12, wherein the second request comprises an endpoint identifier (EID) and an EID name space and is sent as a location identifier separation protocol (LISP) control plane message.

15. The one or more non-transitory computer-readable storage media of claim 9, wherein the operations further comprise:
receiving, form a third network device, a third request for second mapping information associated with a second endpoint;
determining, based at least in part on a query to the second network device about the second endpoint, that no mapping information is available for the second endpoint; and
sending, to the third network device, a second response indicating that no mapping information is available for the second endpoint.

16. The one or more non-transitory computer-readable storage media of claim 15, wherein the operations further comprise:
causing the third network device to store an indication that no mapping information is available for the second endpoint, the indication prohibits the third network device to further request the second mapping information within a time period.

17. A mapping server comprising:
one or more processors; and
one or more memories storing instructions that, upon execution, by the one or more processors, cause the mapping server to:
receive, from a first network device storing a first map table, a first request for mapping information associated with an endpoint such that the first network device can send traffic to the endpoint, the first request received based at least in part on the first map table lacking the mapping information;
determine, based at least in part on the first request, that the mapping information-is lacking from a second map table of the mapping server, the second map table being different than the first map table;

send, to a second network device based at least in part on the mapping server determining that the mapping information is lacking from the second map table, a second request indicating the endpoint, the second request causing the second network device to discover the endpoint;

receive, from the second network device, an indication of a discovery of the endpoint by the second network device; and send, to the first network device, a response to the first request, the response indicating the mapping information, the mapping information indicating that the traffic can be sent to the endpoint via the second network device.

18. The mapping server of claim 17, wherein the one or more memories store additional computer-readable instructions that, upon execution by the one or more processors, configure the mapping server to:

start a timer based at least in part on the second request being sent;

determine that the mapping information is available to send to the first network device based at least in part on the indication being received prior to an expiration of the timer; and store the mapping information in the one or more memories.

19. The mapping server of claim 17, wherein the one or more memories store additional computer-readable instructions that, upon execution by the one or more processors, configure the mapping server to:

receive, from the first network device, a third request for second mapping information for another endpoint;

send, to the second network device, a fourth request indicating the other endpoint;

determine, based at least in part on the fourth request, that the second mapping information is unavailable; and send, to the first network device, another response indicating that the second mapping information is unavailable, the other response causing the first network device to store an indication valid for a predefined time period that the second mapping information is unavailable.

20. The mapping server of claim 19, wherein the one or more memories store further computer-readable instructions that, upon execution by the one or more processors, configure the mapping server to:

start a timer based at least in part on the fourth request being sent, wherein the second mapping information is determined to be unavailable is based at least in part on a determination that no response to the fourth request is received from the second network device before an expiration of the timer.

\* \* \* \* \*